US 12,054,192 B2

(12) United States Patent
Anraku et al.

(10) Patent No.: US 12,054,192 B2
(45) Date of Patent: Aug. 6, 2024

(54) ABNORMALITY DETECTION DEVICE

(71) Applicant: JTEKT CORPORATION, Kariya (JP)

(72) Inventors: Koji Anraku, Okazaki (JP); Isao Namikawa, Okazaki (JP); Takuji Yoshida, Toyota (JP)

(73) Assignee: JTEKT CORPORATION, Kariya (JP)

( * ) Notice: Subject to any disclaimer, the term of this patent is extended or adjusted under 35 U.S.C. 154(b) by 71 days.

(21) Appl. No.: 17/526,117

(22) Filed: Nov. 15, 2021

(65) Prior Publication Data

US 2022/0153346 A1 May 19, 2022

(30) Foreign Application Priority Data

Nov. 19, 2020 (JP) ................................ 2020-192750

(51) Int. Cl.
 *B62D 5/04* (2006.01)
 *B60W 40/10* (2012.01)
 *B62D 6/10* (2006.01)
 *B62D 15/02* (2006.01)

(52) U.S. Cl.
 CPC ........... *B62D 15/021* (2013.01); *B60W 40/10* (2013.01); *B62D 5/0481* (2013.01); *B60W 2554/4041* (2020.02)

(58) Field of Classification Search
 None
 See application file for complete search history.

(56) References Cited

U.S. PATENT DOCUMENTS

| 2015/0239492 | A1 | 8/2015 | Yukitake |
| 2018/0194390 | A1* | 7/2018 | Goto ................. B62D 5/046 |
| 2019/0210639 | A1 | 7/2019 | Wang et al. |
| 2021/0046972 | A1* | 2/2021 | Fujita ................ B62D 6/008 |
| 2022/0126809 | A1* | 4/2022 | Tamura ............... B60W 10/02 |

FOREIGN PATENT DOCUMENTS

| DE | 102018100515 A1 | 7/2019 |
| JP | 2015-160504 A | 9/2015 |

OTHER PUBLICATIONS

Apr. 22, 2022 Extended European Search Report issued in European Patent Application No. 21208389.3.

* cited by examiner

*Primary Examiner* — Jonathan M Dager
*Assistant Examiner* — Laura E Linhardt
(74) *Attorney, Agent, or Firm* — Oliff PLC

(57) ABSTRACT

An abnormality detection device includes a processing circuit configured to perform an abnormality detecting process. The abnormality detecting process includes a first state quantity acquiring process, a second state quantity acquiring process, a difference calculating process of calculating a difference between a first state quantity and a second state quantity, and a determination process of comparing an absolute value of the difference with a difference threshold value. The abnormality detecting process is a process of detecting an abnormality of a turning unit when the absolute value of the difference is greater than the difference threshold value, and the processing circuit is configured not to perform the determination process when an absolute value of an actual current value is greater than a current threshold value.

3 Claims, 2 Drawing Sheets

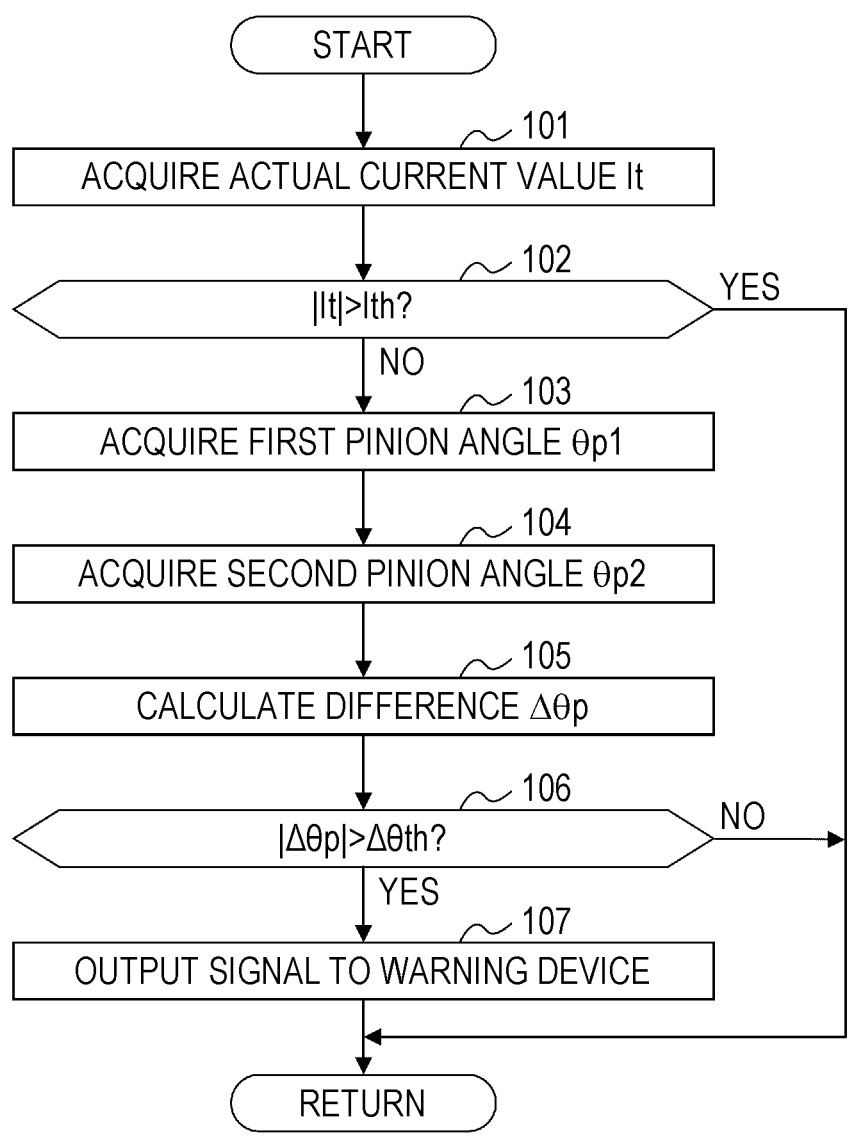

ABNORMALITY DETECTION DEVICE

CROSS-REFERENCE TO RELATED APPLICATION

This application claims priority to Japanese Patent Application No. 2020-192750 filed on Nov. 19, 2020, incorporated herein by reference in its entirety.

BACKGROUND

1. Technical Field

The disclosure relates to an abnormality detection device.

2. Description of Related Art

In related art, a steer-by-wire steering system in which a power transmission path between a steering unit that is connected to a steering wheel and a turning unit that turns turning wheels is cut off is known as a steering system of a vehicle. For example, a turning unit of a steering system described in Japanese Unexamined Patent Application Publication No. 2015-160504 (JP 2015-160504 A) includes a motor that is a drive source, a turning shaft that is connected to turning wheels, and a power transmission mechanism that transmits a torque of the motor to the turning shaft.

For example, the torque of the motor may not be smoothly transmitted to the turning shaft due to an abnormality of the power transmission mechanism. Therefore, a steering control device that controls the steering system described in JP 2015-160504 A detects an abnormality of the turning unit based on a relationship between a rotation angle of the motor and a turning angle of the turning wheels. Specifically, the steering control device stores in advance a relationship between the rotation angle of the motor and the turning angle at a time when the power transmission mechanism is normal. The steering control device detects an abnormality of the turning unit by comparing the relationship between the rotation angle and the turning angle at the time when the power transmission mechanism is normal with a relationship between the rotation angle and the turning angle that are actually detected.

SUMMARY

Recently, higher accuracy has been required for detection of an abnormality of a steering system. Accordingly, there is demand for development of new techniques capable of more accurately detecting an abnormality of a turning unit. This problem can be similarly caused, for example, in a turning unit constituting an electric power steering system as well as a turning unit constituting a steer-by-wire steering system.

The disclosure provides an abnormality detection device that can accurately detect an abnormality of a turning unit.

According to an aspect of the disclosure, there is provided an abnormality detection device configured to detect an abnormality of a turning unit including a motor that is a drive source, a turning shaft that is connected to turning wheels, a power transmission mechanism configured to transmit a torque of the motor to the turning shaft, a first sensor configured to detect a rotation angle of the motor, a second sensor configured to detect a conjunction state quantity indicating position information on a conjunction member that is mechanically connected to the motor via the power transmission mechanism, and a current sensor configured to detect an actual current value that is a value of an actual current supplied to the motor. The abnormality detection device includes a processing circuit configured to perform an abnormality detecting process. The abnormality detecting process includes a first state quantity acquiring process of acquiring a first state quantity indicating position information on a convertible member based on the rotation angle detected by the first sensor, the first state quantity being convertible to a turning angle of the turning wheels; a second state quantity acquiring process of acquiring a second state quantity indicating position information on the convertible member based on the conjunction state quantity detected by the second sensor; a difference calculating process of calculating a difference between the first state quantity and the second state quantity; and a determination process of comparing an absolute value of the difference with a difference threshold value. The abnormality detecting process is a process of detecting the abnormality of the turning unit when the absolute value of the difference is greater than the difference threshold value. The processing circuit is configured not to perform the determination process when an absolute value of the actual current value is greater than a current threshold value.

Each of the first state quantity and the second state quantity indicates the position information on the convertible member. Accordingly, when the turning unit is normal, the absolute value of the difference between the first state quantity and the second state quantity is equal to or less than the difference threshold value. Here, when the absolute value of the actual current value that is the value of the actual current supplied to the motor is large, that is, when the motor outputs a large torque, for example, a large force acts on constituent components of the power transmission mechanism. Accordingly, even when the rotation angle of the motor changes, the conjunction state quantity indicating the position information on the conjunction member may not change due to, for example, elastic deformation of the constituent components of the power transmission mechanism. That is, the second state quantity may not change in spite of change of the first state quantity, and thus, the absolute value of the difference may increase. Accordingly, when the absolute value of the actual current value is large, the absolute value of the difference may be greater than the difference threshold value even if the turning unit is normal.

In this regard, with the aforementioned configuration, the processing circuit does not perform the determination process when the absolute value of the actual current value is greater than the current threshold value. Accordingly, it is possible to reduce the possibility that the turning unit is erroneously determined to be abnormal due to, for example, elastic deformation of the constituent components of the power transmission mechanism when the turning unit is actually normal.

In the abnormality detection device according to the aspect, a power transmission path between the turning unit and a steering unit that is steered by a driver may be cut off.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an example of a procedure of an abnormality detecting process for a turning unit, which is performed by a steering control device.

DETAILED DESCRIPTION OF EMBODIMENTS

Figure 1:
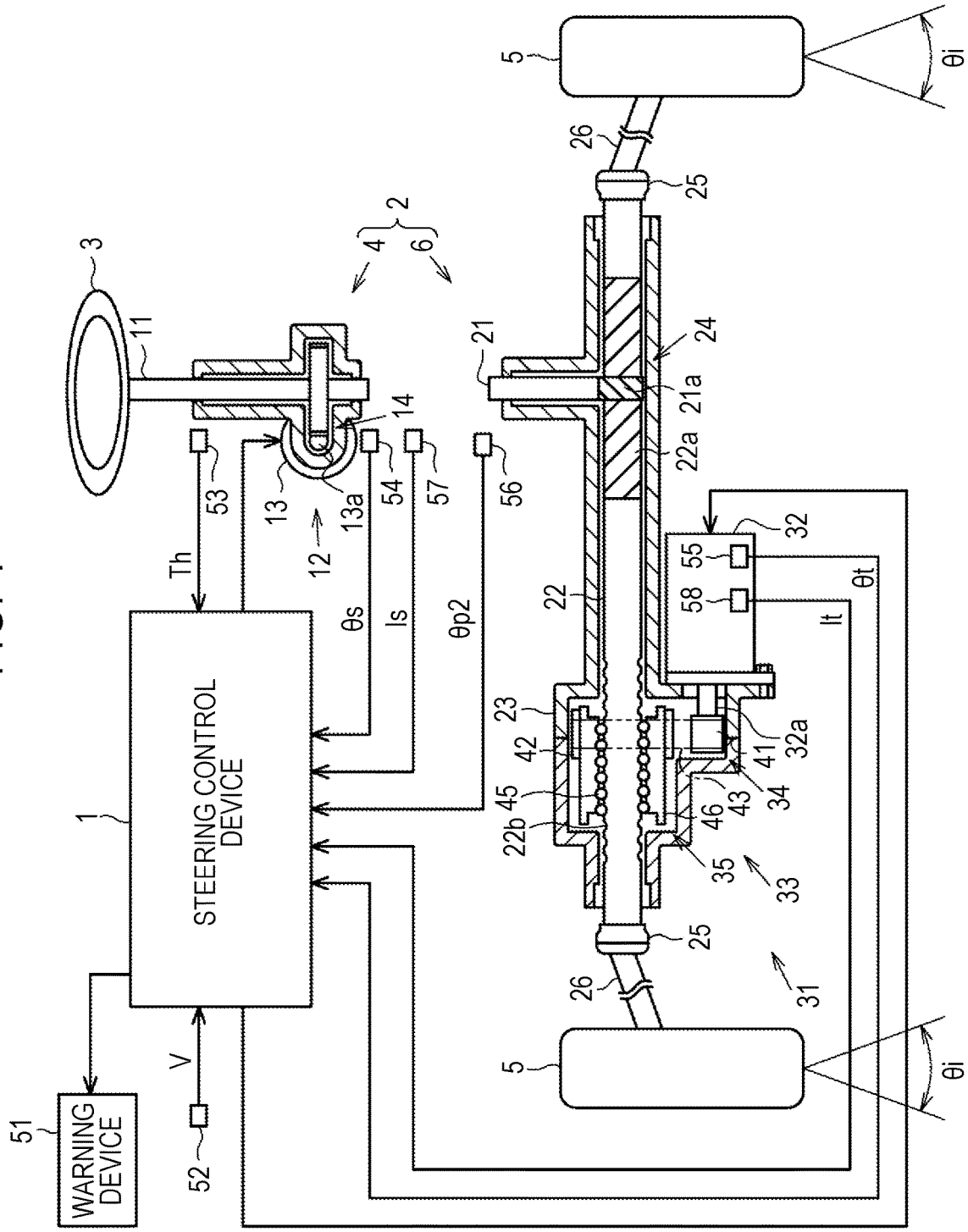
FIG. 1 is a diagram schematically illustrating a configuration of a steering system.

Hereinafter, an abnormality detection device according to an embodiment of the disclosure will be described with reference to the accompanying drawings. As illustrated in FIG. 1, a steering system 2 which is a control object controlled by a steering control device 1 is configured as a steer-by-wire steering system. The steering system 2 includes a steering unit 4 that is steered by a driver via a steering wheel 3 and a turning unit 6 that turns turning wheels 5 according to a driver's steering operation performed on the steering unit 4. The steering system 2 according to this embodiment has a structure in which a power transmission path between the steering unit 4 and the turning unit 6 is normally mechanically cut off.

The steering unit 4 includes a steering shaft 11 to which the steering wheel 3 is connected and a steering-side actuator 12 that applies a steering reaction force which is a force against the steering operation on the steering wheel 3.

The steering-side actuator 12 includes a steering-side motor 13 and a speed reducer 14. The speed reducer 14 employs, for example, a worm and wheel mechanism. The steering-side motor 13 is connected to the steering shaft 11 via the speed reducer 14. Accordingly, the steering reaction force is applied to the steering wheel 3 via the steering shaft 11.

The turning unit 6 includes a pinion shaft 21, a rack shaft 22 that is a turning shaft connected to the pinion shaft 21, a rack housing 23 that accommodates the rack shaft 22 such that it can reciprocate, and a rack and pinion mechanism 24 that includes the pinion shaft 21 and the rack shaft 22. The rack shaft 22 and the pinion shaft 21 are arranged at a predetermined crossing angle in the rack housing 23. A rack and pinion mechanism 24 has a configuration in which pinion teeth 21a formed in the pinion shaft 21 and rack teeth 22a formed in the rack shaft 22 engage with each other. Accordingly, the pinion shaft 21 rotates in accordance with reciprocation of the rack shaft 22. Tie rods 26 are respectively connected to both ends of the rack shaft 22 via ball joints 25. The tips of the tie rods 26 are connected to knuckles (not illustrated) into which the turning wheels 5 are assembled.

The turning unit 6 includes a turning-side actuator 31 that applies a turning force which is a force for turning the turning wheels 5, to the rack shaft 22. The turning-side actuator 31 includes a turning-side motor 32 that serves as a drive source and a power transmission mechanism 33 that transmits a torque of the turning-side motor 32 to the rack shaft 22. The power transmission mechanism 33 according to this embodiment includes a belt mechanism 34 and a ball screw mechanism 35.

The belt mechanism 34 includes a pair of pulleys 41 and 42 and a belt 43 wound around the pair of pulleys 41 and 42. The pair of pulleys 41 and 42 is formed of a resin and the belt 43 is formed of rubber. The ball screw mechanism 35 includes a threaded portion 22b formed on the rack shaft 22 and a ball screw nut 46 that is screwed to the threaded portion 22b via a plurality of balls 45. The pulley 41 is connected to a rotation shaft 32a of the turning-side motor 32. The pulley 42 is fixed to an outer periphery of the ball screw nut 46. Accordingly, the pinion shaft 21 is mechanically connected to the turning-side motor 32 via the rack and pinion mechanism 24 and the power transmission mechanism 33. That is, in this embodiment, the pinion shaft 21 corresponds to a conjunction member.

The turning-side actuator 31 applies a turning force to the turning unit 6 by transmitting rotation of the turning-side motor 32 to the ball screw mechanism 35 via the belt mechanism 34 and causing the ball screw mechanism 35 to convert the transmitted rotation into reciprocation of the rack shaft 22.

In the steering system 2 having the aforementioned configuration, the rack shaft 22 is cause to reciprocate by applying a turning force from the turning-side actuator 31 according to a driver's steering operation, whereby a turning angle $\theta i$ of the turning wheels 5 is changed. At this time, a steering reaction force against the driver's steering operation is applied to the steering wheel 3 from the steering-side actuator 12.

An electrical configuration according to this embodiment will be described below. The steering control device 1 is connected to the steering-side motor 13 and the turning-side motor 32 and operates the steering-side motor 13 and the turning-side motor 32. The steering control device 1 detects an abnormality of the turning unit 6 due to which a torque of the turning-side motor 32 cannot be smoothly transmitted to the rack shaft 22. That is, the steering control device 1 corresponds to an abnormality detection device. Examples of the abnormality detected by the steering control device 1 include an increase in permanent elongation of the belt 43 due to aging (i.e., time-dependent deterioration). The steering control device 1 is connected to a warning device 51 including a warning lamp or a speaker and the steering control device 1 operates the warning device 51.

The steering control device 1 can be configured as a processing circuit including (1) one or more processors that operate in accordance with a computer program (software), (2) one or more dedicated hardware circuits such as an application-specific integrated circuit (ASIC) that performs at least some of various processes, or (3) a combination thereof. The processor includes a central processing unit (CPU) and memories such as a RAM and a ROM, and the memories store program codes or commands configured to cause the CPU to perform processing. Memories, that is, non-transitory computer-readable media, include all available media that can be accessed by a general-purpose or dedicated computer. Various kinds of control in the steering control device 1 are performed by causing the CPU to execute programs stored in the memories at intervals of a predetermined operation cycle.

Detection results from various sensors are input to the steering control device 1. Examples of the various sensors include a vehicle speed sensor 52, a torque sensor 53, a steering-side rotation angle sensor 54, a turning-side rotation angle sensor 55, a pinion angle sensor 56, a steering-side current sensor 57, and a turning-side current sensor 58.

The vehicle speed sensor 52 detects a vehicle speed V which is a travel speed of the vehicle. The torque sensor 53 detects a steering torque Th that is applied to the steering shaft 11. The steering-side rotation angle sensor 54 detects a rotation angle $\theta s$ of a rotation shaft 13a of the steering-side motor 13 as a relative angle in a range of 360°. The turning-side rotation angle sensor 55 detects a rotation angle $\theta t$ of a rotation shaft 32a of the turning-side motor 32 as a relative angle. The pinion angle sensor 56 detects a second pinion angle $\theta p2$ that is a rotation angle of the pinion shaft 21 as an absolute angle in a range including a range exceeding 360°. For example, the second pinion angle $\theta p2$ has a positive value when it is on the right side with respect to a pinion angle midpoint which is an angle when the vehicle travels straight and has a negative value when it is on the left side with respect to the pinion angle midpoint. In this embodiment, since the pinion shaft 21 corresponds to a conjunction member, the second pinion angle θp2 corresponds to a conjunction state quantity. The turning-side rotation angle sensor 55 corresponds to a first sensor and the pinion angle sensor 56 corresponds to a second sensor.

The steering-side current sensor 57 detects an actual current value Is that is a value of an actual current supplied to the steering-side motor 13. The actual current value Is indicates a magnitude of a torque that is output from the steering-side motor 13. The actual current value Is has a positive value when a torque for rotating the steering wheel 3 to the right side is generated and has a negative value when a torque for rotating the steering wheel 3 to the left side is generated. The turning-side current sensor 58 detects an actual current value It that is a value of an actual current supplied to the turning-side motor 32. The actual current value It indicates a magnitude of a torque that is output from the turning-side motor 32. The actual current value It is a positive value when a torque for turning the turning wheels 5 to the right side is generated and is a negative value when a torque for turning the turning wheels 5 to the left side is generated.

An outline of reaction control through the operation of the steering-side motor 13 will now be described. The steering control device 1 calculates a target reaction torque that is a target value of a steering reaction force based on the steering torque Th and the vehicle speed V. The steering control device 1 operates the steering-side motor 13 such that a motor torque corresponding to the target reaction torque is generated. Accordingly, a steering reaction force is applied to the steering unit 4.

An outline of turning control through the operation of the turning-side motor 32 will be described below. The steering control device 1 calculates a steering angle θh that is a rotation angle of the steering shaft 11 based on the rotation angle θs of the steering-side motor 13. Specifically, for example, the steering control device 1 counts the number of rotations of the steering-side motor 13 with respect to a steering midpoint and calculates a total angle that is an angle obtained by totaling the rotation angles θs with respect to the steering midpoint. The steering midpoint is a steering angle θh when the steering wheel 3 is located at the center of a steerable range. The steering control device 1 calculates the steering angle θh of the steering wheel 3 by multiplying the total angle by a conversion factor based on a rotation speed ratio of the speed reducer 14. For example, the steering angle θh has a positive value when it is an angle on the right side with respect to the steering midpoint and has a negative value when it is an angle on the left side with respect to the steering midpoint.

For example, the steering control device 1 counts the number of rotations of the turning-side motor 32 with respect to a pinion angle midpoint and calculates a total angle that is an angle obtained by totaling the rotation angles θt with respect to the pinion angle midpoint. The steering control device 1 calculates a first pinion angle 41 that is convertible to a turning angle θi of the turning wheels 5 by multiplying the total angle by a conversion factor based on a speed reduction ratio of the belt mechanism 34, a lead of the ball screw mechanism 35, and a rotation speed ratio of the rack and pinion mechanism 24. That is, the first pinion angle 41 is basically the same angle as the second pinion angle θp2 that is detected by the pinion angle sensor 56. For example, the first pinion angle θp1 has a positive value when it is an angle on the right side with respect to the pinion angle midpoint and has a negative value when it is an angle on the left side with respect to the pinion angle midpoint.

The steering control device 1 calculates a target pinion angle θp* that is a target value of the first pinion angle θp1 based on the steering angle θh. For example, the steering control device 1 sets, as the target pinion angle θp*, a value obtained by dividing the steering angle θh by a transmission ratio which changes depending on the steering angle θh and the vehicle speed V. The steering control device 1 calculates a target turning torque that is a target value of a turning force by performing feedback control such that the first pinion angle 41 conforms to the target pinion angle θp*. The steering control device 1 operates the turning-side motor 32 such that a motor torque corresponding to the target turning torque is generated. Accordingly, the turning force is applied to the turning unit 6.

An abnormality detecting process for the turning unit 6 will be described below. Since the pinion shaft 21 rotates in accordance with reciprocation of the rack shaft 22 as described above, the rotation angle of the pinion shaft 21 is convertible to (i.e., can be converted to) the turning angle θi of the turning wheels 5. Accordingly, in this embodiment, the pinion shaft 21 serves as a convertible member. The first pinion angle θp1 that is calculated based on the rotation angle θt as described above corresponds to a first state quantity. The second pinion angle θp2 that is detected by the pinion angle sensor 56 corresponds to a second state quantity.

The steering control device 1 acquires a first pinion angle 41 in the abnormality detecting process. The first pinion angle 41 may be calculated in the course of performing the turning control or may be calculated separately based on the rotation angle θt of the turning-side motor 32 in the abnormality detecting process. The steering control device 1 acquires a second pinion angle θp2 in the abnormality detecting process. The second pinion angle θp2 may be detected in the course of performing the turning control or may be detected separately by the pinion angle sensor 56 in the abnormality detecting process.

The steering control device 1 calculates a difference Δθp between the first pinion angle θp1 and the second pinion angle θp2. Subsequently, the steering control device 1 compares the absolute value of the difference Δθp with a difference threshold value Δθth. When the absolute value of the difference Δθp is greater than the difference threshold value Δθth, the steering control device 1 determines that the turning unit 6 is abnormal. In other words, when the absolute value of the difference Δθp is greater than the difference threshold value Δθth, the steering control device 1 detects an abnormality of the turning unit 6. The reason for this determination is that, since each of the first pinion angle θp1 and the second pinion angle θp2 indicates position information on the pinion shaft 21, the absolute value of the difference Δθp is equal to or less than the difference threshold value Δθth based on tolerances of constituent components of the turning unit 6 when the turning unit 6 is normal. For example, the difference threshold value Δθth is set to an angle which is equal to or greater than a maximum value of the difference Δθp which can be caused in a range obtained by totaling the tolerances of the constituent components of the turning unit 6.

When the absolute value of the actual current value It supplied to the turning-side motor 32 is large, that is, when the turning-side motor 32 outputs a large torque, a large force acts, for example, on constituent components of the power transmission mechanism 33. Accordingly, for example, even when the rotation angle θt of the turning-side motor 32 changes, the second pinion angle θp2 of the pinion shaft 21 may not change due to, for example, elastic stretching of the belt 43. That is, the second pinion angle θp2 may not change in spite of the change of the first pinion angle θp1, and thus, the absolute value of the difference Δθp may increase. Accordingly, when the absolute value of the actual current value It is large, the absolute value of the difference 40p may be greater than the difference threshold value Δθth even if the turning unit 6 is normal.

Therefore, the steering control device 1 according to this embodiment does not perform a determination process based on comparison between the absolute value of the difference Δθp and the difference threshold value Δθth when the absolute value of the actual current value It is greater than a current threshold value Ith based on rigidities of the constituent components of the turning unit 6. In other words, the steering control device 1 performs the determination process only when the absolute value of the actual current value It is equal to or less than the current threshold value Ith. For example, the current threshold value Ith is set to a current value at which a torque is generated such that the sum of an amount of elastic deformation of the belt 43 and an amount of elastic deformation of the pair of pulleys 41 and 42 is excessively large. When it is mentioned that the sum of the amounts of elastic deformation is excessively large, it means that the absolute value of the difference Δθp due to elastic deformation of the belt 43 and the pair of pulleys 41 and 42 is greater than a predetermined proportion of the difference threshold value Δθth.

An example of a procedure of the abnormality detecting process which is performed by the steering control device 1 will be described below with reference to the flowchart illustrated in FIG. 2. The abnormality detecting process is repeatedly performed at intervals of a predetermined operation cycle. As illustrated in FIG. 2, when the actual current value It of the turning-side motor 32 is acquired (Step 101), the steering control device 1 determines whether the absolute value of the actual current value It is greater than the current threshold value Ith (Step 102). When the absolute value of the actual current value It is equal to or less than the current threshold value Ith (Step 102: NO), the process flow proceeds to Step 103.

In Step 103, the steering control device 1 acquires the first pinion angle θp1 which is a first state quantity. Subsequently, the steering control device 1 acquires the second pinion angle θp2 which is a second state quantity (Step 104) and calculates the difference Δθp between the first pinion angle θp1 and the second pinion angle θp2 (Step 105). Then, the steering control device 1 compares the absolute value of the difference Δθp with the difference threshold value Δθth (Step 106). That is, the process of Step 103 corresponds to a first state quantity acquiring process. The process of Step 104 corresponds to a second state quantity acquiring process. The process of Step 105 corresponds to a difference calculating process. The process of Step 106 corresponds to a determination process.

Then, when the absolute value of the difference Δθp is greater than the difference threshold value Δθth (Step 106: YES), the steering control device 1 outputs a signal for operating the warning device 51 such that a driver is warned that an abnormality of the turning unit 6 has been detected (Step 107). On the other hand, when the absolute value of the difference Δθp is equal to or less than the difference threshold value Δθth (Step 106: NO), the steering control device 1 determines that the turning unit 6 is normal and ends the abnormality detecting process.

When the absolute value of the actual current value It is greater than the current threshold value Ith (Step 102: YES), the steering control device 1 does not perform the subsequent process. That is, Step 106 which is the determination process is not performed.

Operations and advantages of this embodiment will be described below. (1) When the absolute value of the actual current value It of the turning-side motor 32 is greater than the current threshold value Ith, the steering control device 1 does not perform the determination process. Accordingly, it is possible to reduce the possibility that the turning unit 6 is erroneously determined to be abnormal due to, for example, elastic deformation of the constituent components of the power transmission mechanism 33 when the turning unit 6 is normal.

This embodiment can be modified as follows. The embodiment and the following modified examples can be combined unless technical contradictions arise. In the aforementioned embodiment, the pinion shaft 21 serves as a conjunction member and the second pinion angle θp2 which is a conjunction state quantity is detected by the pinion angle sensor 56 which is a second sensor, but the disclosure is not limited thereto. For example, the rack shaft 22 may serve as a conjunction member and a stroke position of the rack shaft 22 which is a conjunction state quantity may be detected by a stroke sensor which is a second sensor. In this case, the second pinion angle θp2 which is calculated based on the stroke position detected by the stroke sensor may be used as the second state quantity. The stroke position detected by the stroke sensor may be used as the second state quantity and the stroke position calculated based on the rotation angle θt of the turning-side motor 32 may be used as the first state quantity.

In the aforementioned embodiment, the pinion shaft 21 serves as a convertible member, but the disclosure is not limited thereto, and for example, the rack shaft 22 may serve as a convertible member. In this case, the stroke position calculated based on the rotation angle θt of the turning-side motor 32 may be used as the first state quantity and the stroke position calculated based on the second pinion angle θp2 may be used as the second state quantity.

In the aforementioned embodiment, as long as the determination as to whether the absolute value of the actual current value It is greater than the current threshold value Ith (Step 102) is performed before the determination process which is comparison between the absolute value of the difference Δθp and the difference threshold value Δθth (Step 106), the order thereof can be appropriately changed and the determination may be performed immediately after the difference Δθp has been calculated (Step 105).

In the aforementioned embodiment, the steering system 2 employs a linkless structure in which the steering unit 4 and the turning unit 6 are normally mechanically disconnected from each other, but the disclosure is not limited thereto and a structure in which the steering unit 4 and the turning unit 6 are able to be mechanically disconnected by a clutch may be employed. The disclosure is not limited to a steer-by-wire steering system and an electric power steering system in which a steering torque input by a driver is mechanically transmitted to the turning unit 6 may be employed as the steering system 2. In the electric power steering system, a torque of a motor is applied as an assist force for assisting a driver's steering operation.

What is claimed is:

1. An abnormality detection device configured to detect an abnormality of a turning unit in a steer-by-wire steering system, the turning unit including:

a motor that is a drive source,
a turning shaft that is connected to turning wheels,
a power transmission mechanism including a belt and being configured to transmit a power of the motor to the turning shaft using the belt,
a first sensor configured to detect a rotation angle of the motor,
a second sensor configured to detect a conjunction state quantity indicating position information on a conjunction member that is mechanically connected to the motor via the power transmission mechanism, and
a current sensor configured to detect an actual current value that is a value of an actual current supplied to the motor,
the abnormality detection device comprising:
a processing circuit configured to perform an abnormality detecting process,
wherein the abnormality detecting process includes:
  a first state quantity acquiring process of acquiring, by calculation, a first state quantity indicating estimated position information of a convertible member based on the rotation angle detected by the first sensor, the first state quantity being convertible to a turning angle of the turning wheels;
  a second state quantity acquiring process of acquiring, by detection, a second state quantity indicating current position information of the convertible member based on the conjunction state quantity detected by the second sensor;
  a difference calculating process of calculating a difference between the first state quantity indicating the estimated position of the convertible member and the second state quantity indicating the current position of the convertible member; and
  a determination process of comparing an absolute value of the difference with a difference threshold value,
wherein the abnormality detecting process is a process of detecting the abnormality of the power transmission mechanism associated with elastic stretching of the belt used in transmitting power from the motor to the turning shaft, when the absolute value of the difference is greater than the difference threshold value, and
wherein the processing circuit is configured to not perform the abnormality detecting process in response to determining that an absolute value of the actual current value supplied to the motor is greater than a current threshold value.

2. The abnormality detection device according to claim 1, wherein a power transmission path between the turning unit and a steering unit that is steered by a driver is cut off.

3. The abnormality detection device according to claim 1, wherein
the convertible member is a pinion shaft, and
the second sensor is a pinion angle sensor that detects a rotation angle of the pinion shaft.

* * * * *